UNITED STATES PATENT OFFICE.

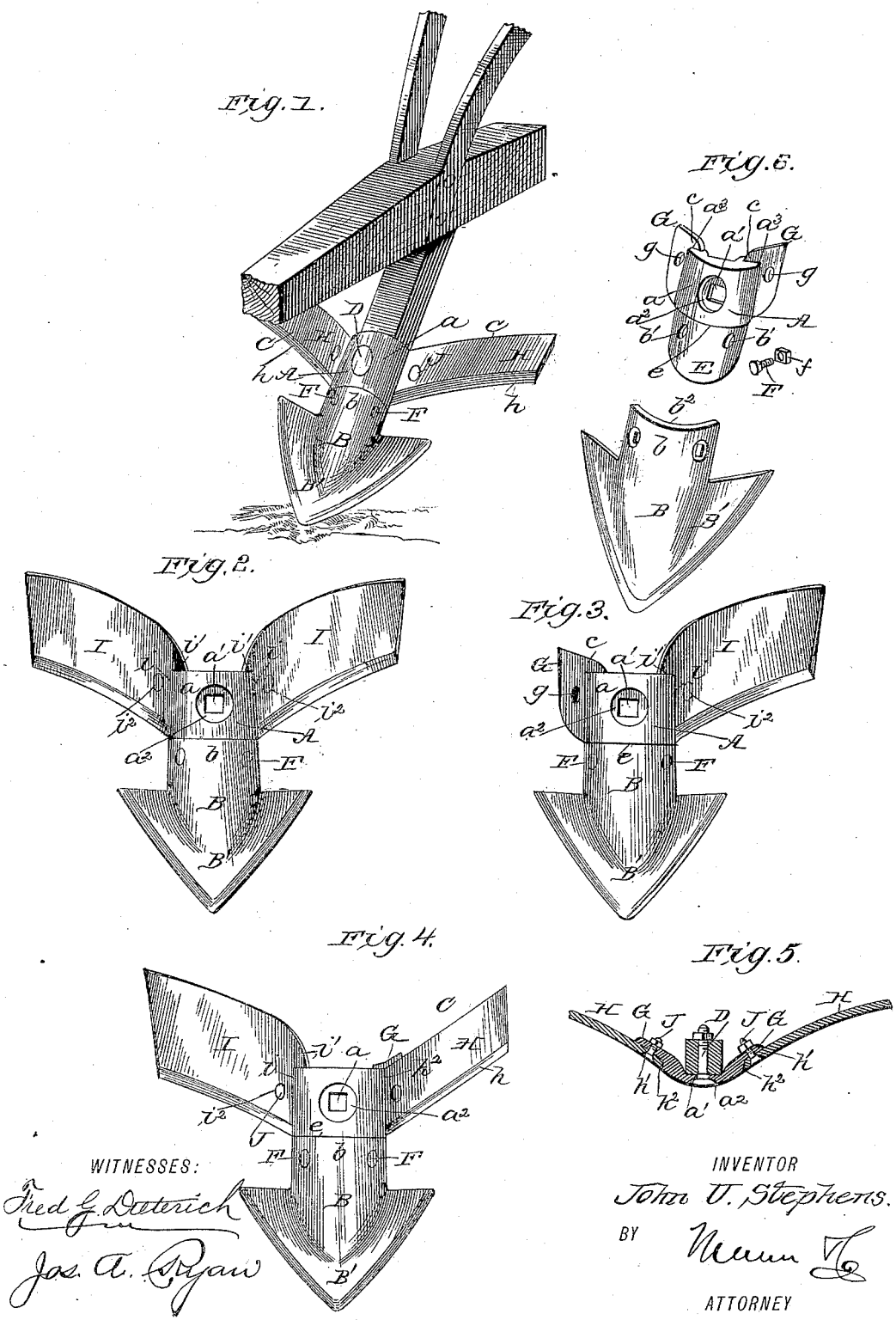

JOHN U. STEPHENS, OF POINT PETER, GEORGIA, ASSIGNOR OF THREE-FOURTHS TO WM. M. TILLER, JOHN W. TILLER, AND JAMES A. BROACH, ALL OF SAME PLACE.

PLOW.

SPECIFICATION forming part of Letters Patent No. 418,389, dated December 31, 1889.

Application filed July 19, 1889. Serial No. 318,031. (No model.)

*To all whom it may concern:*

Be it known that I, JOHN U. STEPHENS, residing at Point Peter, in the county of Oglethorpe and State of Georgia, have invented certain new and useful Improvements in Plows, of which the following is a specification.

My invention is in the nature of combined plow and subsoil-cultivator attachments, to be used on any ordinary plow-stock; and it consists in certain novel features of construction and arrangement of parts, all of which will be hereinafter fully described in the annexed specification, and then pointed out in the claims, reference being had to the accompanying drawings, in which—

Figure 1 is a perspective view of my improvement, showing the cultivator-wings attached. Fig. 2 is a front view of the same arranged as a turning-plow. Fig. 3 is a front view showing same supplied with but a single turning-blade. Fig. 4 is a similar view, with a right-hand turning-blade and a left-hand cultivator-wing. Fig. 5 is a cross-section on the line 5 5, Fig. 1; and Fig. 6 is a perspective view of the point and body sections detached.

In the accompanying drawings, A indicates a body portion, to which is secured the point B and the wings C. The body A consists of a central portion $a$, provided with a large square bolt-hole $a'$, provided with a countersunk recess $a^2$, through which is passed a securing-bolt D, having a squared portion fitting the square hole $a$, and a head fitting the recess $a'$. The bolt D is passed through the plow-stock and serves to securely hold the body A thereto.

The body portion $a$ is of a segment or oval form in horizontal section, and is provided with a downward extension E of similar shape, to the outer face of which is fitted the segmental or oval shaped shank $b$ of the point B, which is detachably secured thereto by two bolts F F, passed through the said shank and extension and held by the nuts $f$ $f$, the heads of said bolts fitting in countersunk recesses $b'$ $b$ in the shank, as most clearly shown in Fig. 5 of the drawings.

The extension E is of about half the thickness of the body portion $a$, whereby an offset $e$ is formed, against which the upper end $b^2$ of the point-shank abuts, said shank being of such a thickness as to cause the outer faces of the body portion and said shank to be flush, forming when jointed practically a continuous shank, the downward slope of which is straight.

The point B proper is formed of a triangular plate B', the upper portion of which extends laterally to each side of the shank, so as to admit the dirt or clay to fall back into the furrow after it has been broken up by the point, which, being straight, will enter into and break the hardest land that is possible for a plow to break.

G G denote ears projecting laterally from the body part $a$, the front faces of which are depressed, forming offsets or shoulders $a^3$ $a^3$ on each side of the body part $a$, the upper ends of said ears projecting upward from the rear face of said body part, forming offsets $c$ $c$, as most clearly shown in Fig. 6 of the drawings. Each of the ears G G is provided with a bolt-aperture $g$ $g$.

The wings C C may either be formed in shape of cultivator-wings H, as shown in Fig. 1, or turning-blades I, as shown in Fig. 2. The cultivator-wings H are each formed of an elongated and slightly-concaved plate provided with the usual cutting-edge $h$ $h$, as shown, and each provided near their inner ends with a countersunk bolt-hole $h'$. In adjusting the said plates in position their inner edges $h^2$ abut the offsets $a^3$ $a^3$, said plates being held in place by a bolt J, passed through the hole $h$ and the bolt-holes $g$ in the ears G, and a securing-nut on the inner side of said ears.

The turning-blades consist each of an elongated twisted plate formed like a mold-board, the inner ends of which are provided with cut-away portions $i$ $i$, forming extensions $i'$ $i'$ and countersunk bolt-holes $i^2$ $i^2$, as shown. To secure the turning-wings in place, the cut-away portions are fitted against the offsets $a^3$ and the extensions over the offsets $c$ $c$. The bolts J are then passed through the holes $i^2 i^2$ and the holes $g$ in the ears and held by the nuts $j$.

It will be observed that by forming the body with the offsets, as described, the several faces of the body, point, and the wings will present an even flush surface, forming no obstruction on which dirt, grass, or litter can gather.

The body or face of the plow-sections being oval in shape will tend to throw the dirt to the sides, and by forming the body portion $a$ with the offsets or shoulders for the point, wings, or blades to fit up against admits of making an exact fit when all the parts are attached, the shoulders at same time aiding the bolts to hold the parts together and thereby relieving the strain.

It will be seen that by my construction of plow the blades or wings may be detached at will without taking the body off the plow-standard, or the point may be replaced by others without removing any of the other parts. The turning-blades may be of various forms of twist, so as to throw either smaller or greater amount of dirt, as may be desired. When the plow is provided with wings, as shown in Fig. 1, it forms a cultivator, the point breaking the dirt and feeding a part to the blades, which place the dirt, as desired, among the cotton, corn, &c., being worked. If desired, only the right turning-blade may be used with body and point for bedding land, plowing in grain, &c., or the right and left hand turning-blades may be used at same time, thereby making a middle splitter. The left-hand wing and the right-hand blade may be used at same time, making the wing cultivate the plant and the turner cover up or work the middle of the row between the plants, or all the wings may be detached, leaving only the point and body, thereby making a scooter or straight shovel.

From the foregoing description it will be seen that my improved plow is complete in itself, and that the same may be converted into the different forms described without detaching the body portion from the plow-stock.

Having thus described my invention, what I claim, and desire to secure by Letters Patent, is—

1. A plow having a point provided at its upper end with laterally-extended edges, and provided above said edges with a projection provided with blade-like portions, the edges of the blade-like portions and the upper edges of the point being separated, whereby the dirt may be thrown up over the upper edges of the point into contact with the lower edges of the blade-like portions, substantially as and for the purpose described.

2. As an improvement in plows, the combination, substantially as described, of the point B, having lateral wings B' B', and an upwardly-projecting shank $b$, the body portion A, adapted to be secured to the plow-stock, said body portion having a depending portion E fitting the under side of the point-shank $b$, the front faces of said shank and body portion coinciding, as shown, shoulders $h^2$, formed on said body portions, lateral ears, as G, extended from said shoulders, and the blades H I, detachably secured to said ears, their inner ends abutting the shoulders $h^2$, all arranged substantially as and for the purpose set forth.

3. A combined plow and subsoil planter consisting of a body portion A, adapted to be secured to the plow-standard, provided with a depending extension E and lateral ears G, a point B, having lateral wings B' and a shank portion $b$, said shank $b$ fitting over the said extension E, means for detachably securing said point to the body A, and wings or blades H I, detachably secured to the ears G, the lower edges of said blades disposed above the upper ends of the wing portions B, all arranged substantially as and for the purpose described.

4. The combination, with the body portion A, provided with vertically-disposed side shoulders $h^2$, a point secured on its lower end, and the ears G, formed on said body portion and projecting laterally from the shoulders $h^2 h^2$, of the wings I, detachably secured to the said ears G, said wings having their inner ends abutting the shoulders $h^2 h^2$ and provided with projecting portions $i^2$ overlapping the upper outer edges of the body portion A, substantially as and for the purpose described.

JOHN U. STEPHENS.

Witnesses:
W. E. TILLER,
C. M. WITCHER.